C. W. Deane,
Boiler Cleaner.
No. 113,405. Patented Apr. 4, 1871.
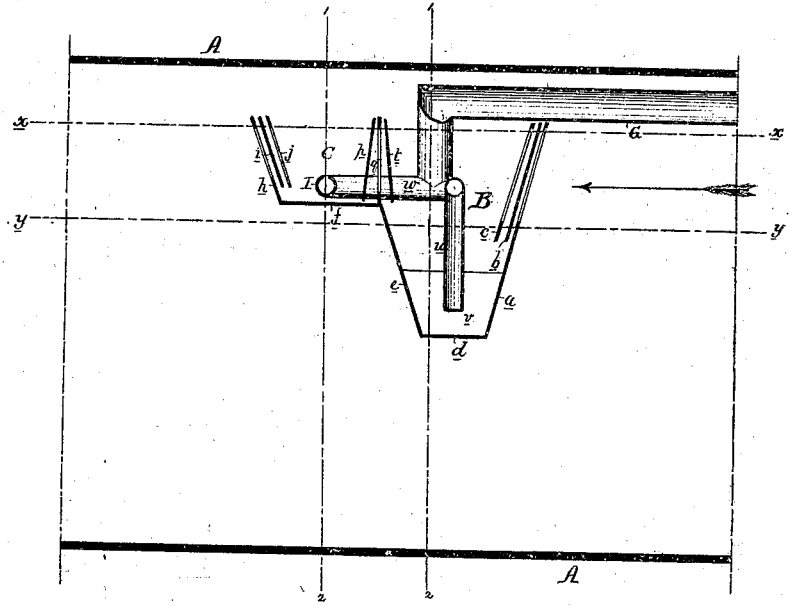
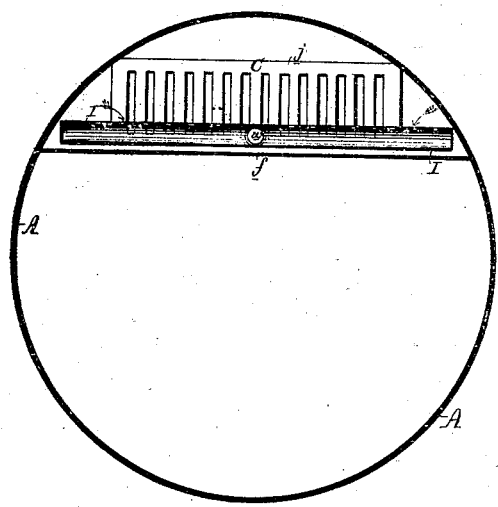
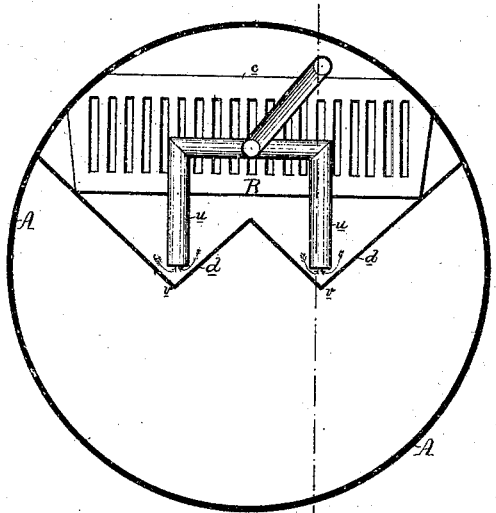
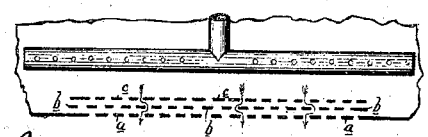
Witnesses
Jno. B. Harding
Harry Smith
C. W. Deane
by his Atty
Howson & Son

United States Patent Office.

COLLINS WOOD DEANE, OF PHILADELPHIA, PENNSYLVANIA.

Letters Patent No. 113,405, dated April 4, 1871.

IMPROVEMENT IN SEDIMENT-COLLECTORS FOR STEAM-BOILERS.

The Schedule referred to in these Letters Patent and making part of the same.

I, COLLINS WOOD DEANE, of Philadelphia, county of Philadelphia, State of Pennsylvania, have invented a Sediment-Collector for Steam-Boilers, of which the following is a specification.

Nature and Object of the Invention.

My invention consists of apparatus, too fully explained hereafter to need preliminary description, for collecting and disposing of the sediment in steam-boilers.

Description of the Accompanying Drawing.

Figure 1 is a section on the line 1–2, fig. 2, of part of a steam-boiler with my improved sediment-collector;
Figure 2, a transverse section on the line 1–2, fig. 1;
Figure 3, a transverse section on the line 1–2, fig. 1; and
Figure 4, a sectional plan of part of fig. 1.

General Description.

A represents a portion of the body or shell of a steam-boiler, the dotted line $x\,x$ representing the highest and the dotted line $y\,y$ the lowest water-line.

There are two mud-traps, B and C, within the shell of the boiler, the former being composed of the inclined plates $a$, $b$, and $c$, bottom plate $d$, and inclined plate $e$; and the trap C consisting of the bottom plate $f$ and inclined plates $h\,i\,j$; and these two traps are separated from each other by the plates $p$, $q$, and $t$, all these plates extending entirely across the shell of the boiler and being connected to the same in any suitable manner.

In the plates $a$, $b$, and $c$, which are arranged at a short distance apart from each other, is a series of parallel vertical slots extending in altitude from the lowest water-line $y$ to the highest water-line $x$, the plates $b$ and $c$ extending downward but a short distance below the line $y$.

The slots in the three plates are so arranged that those in the middle plate $b$ are opposite to the spaces between the slots in the plates $a$ and $c$, as shown in fig. 4. The same arrangement of slots is observed with the plates $p$, $q$, and $t$; which form the partition between the two traps B and C, and a like system of slots is arranged in the plates $h\,i\,j$.

It will be observed, on reference to fig. 2, that in the bottom $d$ of the trap B there are two depressions, $v\,v$, in which are suspended two pipes, $u\,u$, communicating with a larger horizontal pipe, G, which extends through the front end of the boiler, and is there furnished with a suitable valve or cock.

The bottom $f$ of the trap C is straight, as shown in fig. 3, and on or near the bottom of this trough is placed a horizontal pipe, I, perforated on the top and sides with a number of holes, as shown, and this pipe communicates through a branch, $w$, with the main pipe G.

In steam-boilers there is a constant current of water at and near the surface from the fire-box end to the opposite end, and this current carries with it the mud or sediment which is present in all boilers, and which, if it remains there, is converted into hard incrustation.

The object of my invention is to effectually remove this sediment from the boiler.

The current of the surface water in the boiler, fig. 1, flows rapidly from the fire-box end in the direction of the arrow, and this current is in the first instance intercepted by the plate $a$ of the trap B, and as this plate extends entirely across the boiler there is no other course for the current to pursue than through the slots of the said plate $a$.

Many of the particles of sediment which pass with the water through the slots of the plate $a$ strike the plate $b$ between the slots of the latter plate, and are directed to the bottom of the trap B, where the water is necessarily in a quiescent state.

Other particles which may pass through the slots of the plate $b$ are arrested by the ribs between the slots of the third plate $c$, and these again are directed toward the bottom of the trap.

The current of water, still impregnated with more or less mud and sediment, must next pass through the slots of the plates $p$, $q$, and $t$, forming the partition between the two traps; and here again a like filtering process takes place, the particles of mud being directed either to the bottom of the trap B or that of the trap C.

On the immediate surface of the water, however, there is always a very fine sediment, which is apt to escape the filtering action of even two sets of slotted plates; hence the adoption of the trap C and the third set of filtering-plates $h$, $i$, and $j$, which serve effectually to arrest the fine mud.

When the coarser sediment has collected in the trap B and the finer sediment in the trap C to an extent which demands the removal of both accumulations, the cock or valve in which the pipe G terminates is opened, and the pressure of steam will force the mud upward from the trap B through the pipes $u\,u$, and thence through the said pipe G; at the same time the pressure of steam will force the finer mud through the perforations of the pipe I, and thence through the branch $w$ and through the said pipe G.

I am aware that mud-traps bounded by slotted filtering-plates, and communicating with pipes for the discharge of accumulated mud, have been used; but these have been restricted in utility owing to the arrangement which permitted a large portion of the surface current of water to pass unfiltered; whereas the mud-traps in my invention are extended entirely across and are in contact with the shell of the boiler, and thus compel the current to pass through the slotted plates.

There may be one depression $v$ only in the bottom of the mud-trap B, and one discharge-pipe $u$, or there may be three or more such depressions and a corresponding number of discharge-pipes, according to the shape and size of the boiler; in fact, the mud-traps may be modified in shape to suit the style of the boiler, care being taken, however, that the above-mentioned characteristic is preserved; namely, the intercepting of the entire surface current of water by the slotted filtering-plates of the trap.

*Claims.*

A mud-trap, having the within-described slotted filtering-plates so arranged within a steam-boiler as to intercept the entire surface current.

2. The mud-trap B, with its filtering-plates, the whole extending across and connected to the shell of a boiler, as set forth.

3. The surface-mud trap C, with its slotted filtering-plates extending across the boiler, in combination with the perforated discharge-pipe I.

4. The within-described combination and arrangement of the two mud-traps B and C with their filtering-plates.

In testimony whereof I have signed my name to this specification in the presence of two subscribing witnesses.

COLLINS W. DEANE.

Witnesses:
WM. A. STEEL,
FRANKLIN B. RICHARDS.